United States Patent
Lelcuk et al.

(10) Patent No.: US 9,825,928 B2
(45) Date of Patent: Nov. 21, 2017

(54) TECHNIQUES FOR OPTIMIZING AUTHENTICATION CHALLENGES FOR DETECTION OF MALICIOUS ATTACKS

(71) Applicant: RADWARE, LTD., Tel Aviv (IL)

(72) Inventors: Alon Lelcuk, Ramot Meir (IL); Michael Groskop, Tel Aviv (IL); Deena Yehuda, Tel Aviv (IL); Yotam Ben Ezra, Ra'anana (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 14/520,955

(22) Filed: Oct. 22, 2014

(65) Prior Publication Data

US 2016/0119304 A1 Apr. 28, 2016

(51) Int. Cl.
*G06F 21/31* (2013.01)
*H04L 29/06* (2006.01)
*G06F 21/62* (2013.01)

(52) U.S. Cl.
CPC .............. *H04L 63/08* (2013.01); *G06F 21/31* (2013.01); *G06F 21/62* (2013.01); *H04L 63/1408* (2013.01); *G06F 2221/2103* (2013.01); *H04L 2463/121* (2013.01)

(58) Field of Classification Search
CPC ..... G06F 2221/2133; G06F 2221/2103; G06F 21/31; G06F 21/62
See application file for complete search history.

(56) References Cited

U.S. PATENT DOCUMENTS

| | | | |
|---|---|---|---|
| 7,895,653 B2 | 2/2011 | Calo et al. | |
| 8,555,388 B1 | 10/2013 | Wang et al. | |
| 2002/0120853 A1* | 8/2002 | Tyree | H04L 63/1458 713/188 |
| 2003/0110296 A1* | 6/2003 | Kirsch | H04L 29/06 709/246 |
| 2003/0163739 A1 | 8/2003 | Armington et al. | |
| 2005/0080921 A1* | 4/2005 | Lu | H04L 63/08 709/237 |
| 2005/0144441 A1* | 6/2005 | Govindarajan | H04L 63/1441 713/160 |

(Continued)

OTHER PUBLICATIONS

Yadava et al., "Time-Variant Captcha: Generating Strong Captcha Security by Reducing Time to Automated Computer Programs", 2011, pp. 701-704.*

*Primary Examiner* — Thaddeus Plecha
(74) *Attorney, Agent, or Firm* — M&B IP Analysts, LLC

(57) ABSTRACT

A method and system for optimizing segregation between human-operated clients and machine-operated clients accessing computing resources are provided. The method comprises receiving, from a client, an authentication request, wherein the authentication request is received in response to a redirect request sent from a remote server to the client; dynamically selecting at least one authentication challenge from a plurality of different authentication challenges; sending the at least one generated authentication challenge to the client; determining whether a notification call is received from the client during a predefined time interval; and upon receiving the notification call during the predefined time interval, confirming that the client passes the authentication challenge, wherein a client that passes the authentication challenge is a human-operated client.

27 Claims, 7 Drawing Sheets

(56) References Cited

U.S. PATENT DOCUMENTS

| | | | |
|---|---|---|---|
| 2007/0179905 A1* | 8/2007 | Buch | G06Q 10/107 705/75 |
| 2010/0281539 A1 | 11/2010 | Burns et al. | |
| 2011/0208714 A1 | 8/2011 | Soukal et al. | |
| 2012/0084146 A1 | 4/2012 | Zwicky | |
| 2012/0233461 A1* | 9/2012 | Takahashi | H04L 9/3271 713/168 |
| 2012/0323700 A1* | 12/2012 | Aleksandrovich | G06Q 30/00 705/14.69 |
| 2013/0124756 A1* | 5/2013 | Voronel | H04L 63/126 709/239 |
| 2013/0198203 A1 | 8/2013 | Bates et al. | |
| 2013/0268490 A1* | 10/2013 | Keebler | G06F 17/30575 707/627 |
| 2013/0312097 A1* | 11/2013 | Turnbull | G06F 21/55 726/24 |
| 2014/0280583 A1 | 9/2014 | Banatwala et al. | |
| 2014/0280939 A1 | 9/2014 | Banatwala et al. | |
| 2014/0286321 A1* | 9/2014 | Balian | H04W 12/06 370/338 |
| 2014/0289508 A1* | 9/2014 | Wang | H04L 63/0853 713/155 |
| 2014/0380418 A1* | 12/2014 | Wang | H04L 63/08 726/3 |
| 2015/0128236 A1* | 5/2015 | Moscicki | H04L 63/0876 726/7 |
| 2015/0156812 A1* | 6/2015 | Qian | H04W 76/068 709/232 |
| 2015/0163224 A1* | 6/2015 | Kim | H04L 63/1441 726/27 |

\* cited by examiner

TECHNIQUES FOR OPTIMIZING AUTHENTICATION CHALLENGES FOR DETECTION OF MALICIOUS ATTACKS

TECHNICAL FIELD

This invention relates generally to implementation of security techniques for detecting and mitigating malicious attacks, and particularly to the implementation of authentication challenges for malicious attack detection.

BACKGROUND

A significant problem facing the Internet community is that on-line businesses and organizations are vulnerable to malicious attacks. Recently, attacks have been committed using a wide arsenal of attack techniques and tools targeting both the information maintained by the online businesses and their IT infrastructure. For example, recently identified attacks have been committed using a combination of attack techniques at the network and application levels. Attackers use different tools to execute different attack techniques. Each such attack tool is designed to exploit weaknesses identified in one of the target's defense layers.

An example for such an attack tool is a Web robot, also known as a botnet or bot (which will be referred to hereinafter as a "bot"). A bot is a software application programmed to execute automated tasks over the Internet. Typically, bots are programmed to perform tasks that are simple and structurally repetitive at a higher rate of speed than a human end user. Commonly, malicious users often use a bot as a means to execute denial-of-service (DoS) attacks, HTTP or HTTPS flood attacks, click frauds, and to spam large amounts of content over the Internet.

Anti-bot techniques typically attempt to verify that a transaction is initiated by a legitimate client application (e.g., web browser) and is under control of a user. Examples for such techniques are a SYN cookie, a web redirect (e.g., 302 HTTP redirect message), a JavaScript challenge, a CAPTCHA, and the like.

In a CAPTCHA action, an image is sent to the user device. The image includes alphanumeric characters that are difficult to recognize by an OCR program, but are visible to a human. The user is prompted to enter the characters displayed in the image. The user is verified if the characters entered by the user correspond to the characters in the image.

The JavaScript challenge requires the client (web browser) to include a JavaScript engine (or to enable execution of a JavaScript) in order to view the web page or to perform any action in a webpage. Other JavaScript redirect challenges invite the browser on the client device to respond to such a message by a request for a new URL specified in the redirected message, or to wait for an input from the user.

SYN cookie authentication techniques validate the IP address of the client issuing the transaction. However, such techniques can be easily bypassed by an attack tool (or an application) that owns a real IP address (not a spoofed address).

The CAPTCHA action has been determined to be more effective than the other actions in confirming that a transaction is issued by a human and not by malware. However, at the same time, this technique negatively affects the user experience while accessing the web services. The redirect challenges, on the other hand, provide a "seamless experience" for a legitimate user. Thus, such an authentication technique is typically implemented at least as a first measure for blocking illegitimate users.

FIG. 1 illustrates a schematic diagram of a network system 100 utilized to illustrate execution of script redirect challenges. In the system 100, a client 110 communicates with a server 120 over a network 130. The server 120 is the entity to be protected from malicious threats. The client 110 and the server 120 communicate using communication protocols, such as a hypertext transfer protocol (HTTP), HTTP Secure (HTTPS), and the like. The client 110 is a legitimate client that executes a web browser 115 with a JavaScript engine enabled. An attack tool 140 is also communicatively connected to the network 130. The attack tool 140 executes malicious attacks against the server 120. The attack tool 140 may be, for example, a bot machine.

In a typical in-line deployment such as that illustrated in FIG. 1, a security system 150 is connected in-line with the server 120. The security system 150 intercepts requests (HTTP/HTTPS requests) generated by the client 110 and/or attack tool 140. The requests are directed to the server 120 upon being authenticated.

To authenticate requests directed to the protected server 120, the security system 150 generates an authentication challenge that is difficult for the attack tool 140 to pass, but is not difficult for a legitimate client such as, e.g., client 110, running a web browser. Examples for an authentication challenge may be a JavaScript challenge, an HTML5 challenge, and the like.

To this end, the security system 150 intercepts a request directed to the server 120 and returns a response with a piece of JavaScript code. The client 110 or an attack tool 140 receiving the request should include a web browser that can parse and run the JavaScript code embedded in the response. Execution of the JavaScript code on the web browser causes either redirection to a different URL or the user to perform an action (such as providing an input, moving the mouse, and so on). If the client is authenticated, the security system 150 may establish or re-use a pre-established connection with the client to allow direct communication with the protected server 120.

Security threats have become more complex and attackers are now more sophisticated. For example, JavaScript redirect challenges can be bypassed using a parser and without any JavaScript engine operable in the attack tool. A simple parser is sufficient to bypass the challenge as the JavaScript are static with constant information that should be revealed. Another bypass solution is the utilization of "headless browsers." In addition, attackers more often use dynamically changing IP addresses or hide behind proxy servers such as content distribution networks (CDNs).

Therefore, in order to allow efficient mitigation of security attacks, and in particular application-layer attacks, security systems should quickly adapt to new threats. Further, such solutions may need to be able to generate complex challenges that are difficult to bypass by evolving threats. Moreover, the security systems should efficiently mitigate and block attacks during both attack active and attack inactive times, also known as "peace" and "war" times, respectively. That is, attacks should be mitigated and blocked both when the volume of attacks is relatively high ("war" times) and when the volume of attacks is relatively low ("peace" times). In particular, current solutions can scale up to mitigate high volume attacks.

Although existing security systems can mitigate large scale attacks, such mitigation would require maximizing the utilization of computing resources of such systems. Therefore, a straightforward approach of increasing the number of systems is a costly solution, and, moreover, such a vast number of security systems may not be needed during attack inactive times. Furthermore, the conventional security systems cannot be updated to handle new threats on-the-fly, as typical updates require re-configuration of the system and network connections.

Therefore, it would be advantageous to provide an efficient security solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all embodiments. Its sole purpose is to present some concepts of one or more embodiments in a simplified form as a prelude to the more detailed description that is presented later. For convenience, the term some embodiments may be used herein to refer to a single aspect or multiple embodiments of the disclosure.

The disclosure relates in various embodiments to a method for optimizing segregation between human-operated clients and machine-operated clients accessing computing resources. The method comprises receiving, from a client, an authentication request, wherein the authentication request is received in response to a redirect request sent from a remote server to the client; dynamically selecting at least one authentication challenge from a plurality of different authentication challenges; sending the at least one generated authentication challenge to the client; determining whether a notification call is received from the client during a predefined time interval; and upon receiving the notification call during the predefined time interval, confirming that the client passes the authentication challenge, wherein a client that passes the authentication challenge is a human-operated client.

The disclosure further relates in various embodiments to a system for a challenge machine for authenticating clients accessing computing resources. The system comprises a processor; and a memory communicatively connected to the processor, the memory containing instructions that, when executed by the processor, configure the system to: receive, from a client, an authentication request, wherein the authentication request is received in response to a redirect request sent from a remote server to the client; dynamically select at least one authentication challenge from a plurality of different authentication challenges; send the at least one generated authentication challenge to the client; determine whether a notification call is received from the client during a predefined time interval; and upon receiving the notification call during the predefined time interval, confirming that the client passes the authentication challenge, wherein the client that passes the authentication challenge is a human-operated client.

The disclosure further relates in various embodiments to method for authenticating clients accessing computing resources. The method comprises receiving, from a client, a request to access a computing resource of a protected entity; generating a redirect request including a set of parameters; sending the redirect request to the client, wherein the redirect request causes the client to access at least one challenge machine; receiving, by the at least one challenge machine, an authentication request, wherein the authentication request is received in response to the redirect request; dynamically selecting at least one authentication challenge by the at least one challenge machine for execution by the client; generating an authentication object using a set of parameters included in the redirect request, wherein the authentication object is generated upon passing the authentication challenge by the client; and receiving, by a system, the authentication object from the at least one challenge machine; and upon determining that the authentication object is valid, authenticating the client.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
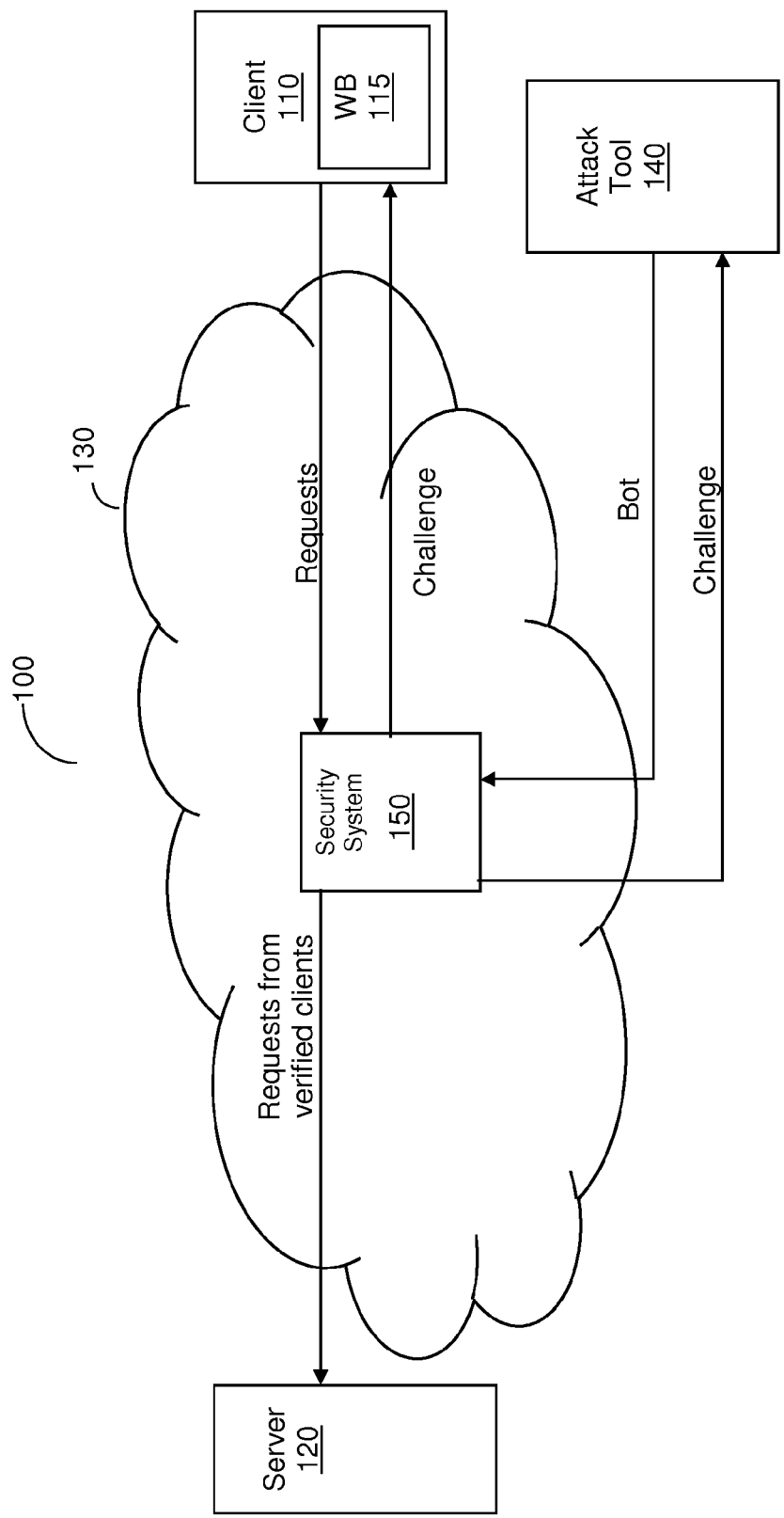
FIG. 1 illustrates a network system utilized to describe execution of JavaScript challenge operations.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
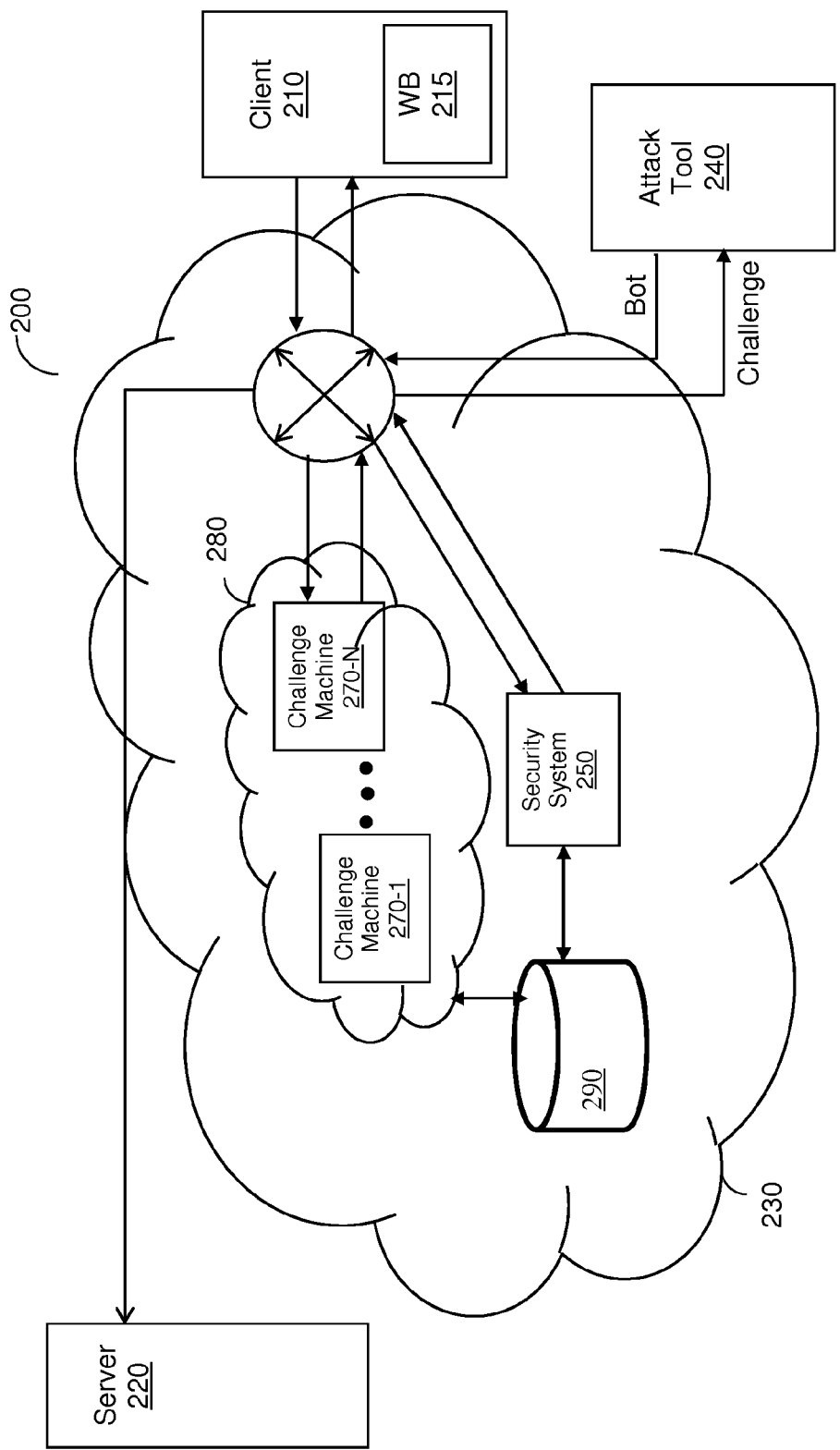
FIG. 2 illustrates an off-path deployment of a security system utilized to describe the disclosed embodiments.

FIG. 2 illustrates an exemplary and non-limiting diagram of a network system 200 utilized to describe the various disclosed embodiments. In the network system 200, a client 210 communicates with a server 220 over a network 230. The server 220 is the entity to be protected from malicious threats. The client 210 and the server 220 communicate using communication protocols, such as a hypertext transfer protocol (HTTP), HTTPS, and the like. The client 210 is a legitimate and un-authenticated computing device that executes a web browser 215 with a scripting (e.g., JavaScript) engine enabled. The web browser 215 may be realized as a mobile application ("app"), an agent installed in the client 215, an add-on component, a plug-in component, and the like. The client 210 may be a PC, a mobile phone, a smart phone, a tablet computer, and the like.

In the exemplary network system 200 shown in FIG. 2, an attack tool 240 is also communicatively connected to the network 230. The attack tool 240 may execute a code (such as bot or "zombie") to carry out malicious attacks against the server 220. Such attacks may be, but are not limited to, DoS/DDoS attacks, click frauds, spams, web scraping, HTTP/HTTPS flood, and the like. The attack tool 240 can execute an attack by using means other than a bot. The network 230 may be, but is not limited to, a local area network, a wide area network, the Internet, one or more data centers, a cloud computing infrastructure, a cellular network, a metropolitan area network (MAN), or any combination thereof. The cloud computing infrastructure may be a private cloud, a public cloud, a hybrid cloud, or any combination thereof. The attack tool 240 may be a PC, a mobile phone, a smart phone, a tablet computer, a server, and the like.

It should be noted that, although one client 210, one server 220, and one attack tool 240 are depicted in FIG. 2 merely for the sake of simplicity, the embodiments disclosed herein can be applied to a plurality of clients, attack tools, and/or servers. Thus, the embodiments disclosed herein can be utilized to detect a large scale attack campaign where a vast number of attack tools participate in attacking the protected entity, i.e., the server 220. The clients may be located in different geographical locations. The servers may be part of one or more datacenters, a cloud-computing infrastructure, server frames, or combinations thereof. The server 220 may be, but is not limited to, a web server, an application server, and the like.

In an exemplary embodiment, a reputation database 290 is also connected to the network system 200. The reputation database 290 may include a black list of known malicious clients based on, for example, their IP addresses, fingerprints, or any other identifying parameters. In addition or in alternative to, the reputation database 290 may include profiles of various malicious clients. The profiles and/or black lists are created or otherwise updated based on the authentication embodiments disclosed herein.

According to one embodiment, a security system 250 is communicatively connected in-line with the server 220 (i.e., an in-line deployment). The security system 250 is configured to receive or otherwise intercept requests (HTTP/HTTPS requests) generated by the client 210 and/or by the attack tool 240. The requests are directed to the protected server 220. In another embodiment, the security system 250 can be deployed off-path of the server 220 in a secured datacenter. The secured datacenter can be operable in a cloud-computing infrastructure, a hosting server datacenter, service provider networks, or a cooperative network.

As illustrated in FIG. 2, a plurality of challenge machines 270-1 through 270-N (hereinafter referred to collectively as challenge machines 270 or individually as a challenge machine 270) are communicatively connected to the security system 250 and to the network 230. As will be discussed in greater detail below, the challenge machines 270-1 through 270-N authenticate unknown client machines and users trying to access the protected server 220. The security system 250 allows a client to access the protected server 220 upon authentication by a machine 270. Thus, the security system 250 and the challenge machines 270 implementing the disclosed embodiments allow segregation between human-operated clients and machine-operated clients.

The challenge machines 270 can be deployed in a cloud computing platform 280. The cloud computing platform 280 may be a public cloud, a private cloud, a hybrid cloud, or any combination thereof. Alternatively or collectively, challenge machines 270 can be deployed in a hosting server datacenter, service provider networks, or a cooperative network. The security system 250 is optionally decoupled from the challenge machines 270.

The challenge machines 270 may be physical devices or virtual instances executed within a physical device. Each virtual instance can be addressed by a MAC address, a port number, one or more VLAN IDs, an IP address, packet encapsulation such as generic routing encapsulation (GRE), a network service header (NSH), or any combination thereof. Each virtual instance of a challenge machine can be created on-demand. Thus, according to one embodiment, during war times, there are more active virtual instances of challenge machines than during peace times.

The instantiation and de-instantiation of challenge machines 270 can be triggered and controlled by the security system 250, by an external security monitoring tool, and/or by a system administrator. In an embodiment, the resources required to mitigate an on-going attack are constantly monitored, and resources, i.e., virtual instances of challenge machines, are allocated to mitigate the attack on demand. Once the attack is over, such resources can be released.

In an embodiment, different challenge machines 270 can be utilized to generate different types of authentication challenges and/or different versions of the same type of authentication challenges. For example, a challenge machine 270-1 can generate a JavaScript challenge that requires a user input from a first type (e.g., moving a mouse), a challenge machine 270-2 can generate JavaScript challenge that requires a user input from a second type (e.g., entering a CAPTCHA text), a challenge machine 270-3 can generate JavaScript challenge that only redirects the traffic to a different URL, and a challenge machine 270-N can generate a polymorphic JavaScript challenge. In one embodiment, a single challenge machine 270 can generate different types of challenges. It should be noted that the challenges discussed herein are programmed to avoid cross domain scripting (XSS). The injected script cannot be viewed by other users or received by clients other than the client to be authenticated. The type of challenges can be defined based on the requirements of the protected entity and/or characteristics of the attacker. For example, if the protected entity would require a robust protection and it is known that the attacker implements a parser, then the challenge to be used may involve a CAPTCHA check.

The challenge machines 270 can be configured by the type of challenge and by the challenge version via, e.g., a system administrator or the security system 250. It should be noted that such configuration or installation of new authentication challenges, or updates thereof can be performed on-the-fly without shutting down the operation of the security system 250. As a non-limiting example, if a challenge machine 270-1 is updated or added with a new challenge version, requests can still be verified using, e.g., challenge machines 270-2, . . . , and/or 270-N. Therefore, the dynamic configuration of the challenge machines 270 does not stall the protection provided to the server 220.

In a non-limiting embodiment, each challenge machine 270 can be configured with a set of challenges to perform according to one or more escalation scenarios. An escalation scenario defines a certain order in which to perform a set of different challenges based on an attack's type, properties of the client (attacker), the entity to be protected, and so on. As a non-limiting example, such an escalation scenario may define a first challenge that does not require a user interaction and a second challenge that requires an input from the user.

As noted above, one of the authentication challenges may be a polymorphic JavaScript. Such a challenge generates a polymorphic script code with script code that includes a scrambled secret. In order to discover the secret, the client 210 should be configured to enable execution of a JavaScript engine in its browser. As the script code is polymorphic, it cannot be interpreted by an attack tool 240 implementing parsing programs or lightweight JavaScript interpreters. An example for generation of the polymorphic script challenge can be found in a co-pending U.S. application Ser. No. 14/182,869, titled "METHOD AND SYSTEM FOR DETECTION OF MALICIOUS BOTS," assigned to common assignee, and incorporated herein by reference.

According to the disclosed embodiments, the security system 250 is configured to receive a request from an unauthenticated client such as, e.g., the client 210 or the attack tool 240. In response, the security system 250 is configured to send a redirect script to the client 210 redirecting the client's browser to one of the challenge machines 270. A redirect script may be realized as an AJAX call. In an embodiment, the redirect script includes a set of parameters required to generate an authentication object by the challenge machine 270 to which the client is directed to. The set of parameters may include, for example, an IP address of the client, a time stamp, a current port number, and the like. The authentication object may be, but is not limited to, a cookie, a token, or any other type of data structure that can carry the information discussed in greater above.

The challenge machine 270 which the client is directed to challenges the unauthenticated client 210 using an authentication challenge. The authentication challenge used is the challenge that the respective challenge machine 270 is configured with. Upon successful authentication, the unauthenticated client is forwarded to the protected server 220 with the valid authentication object generated by the machine 270. The security system 250 is configured to evaluate the authentication object. If the received authentication object is determined to valid by the security system 250, the client's request is forwarded to the protected server 220; otherwise, the request is rejected or other actions preventing the client from accessing the server 220 is taken.

In another embodiment, the security system 250 is configured to generate at least one encrypted parameter (for example, by encrypting the system's 250 ID). The encrypted parameter is sent together with a redirect script and one or more "clear" parameters to the client 210. Any of the clear and encrypted parameters may be, for example, a source IP address, a secret seed, a destination IP address, a MAC address, a port number, and so on. Upon execution of the client's browser 215, the redirect script causes connection of the client's browser 215 to one of the challenge machine 270 designated in the redirect script.

The designated challenge machine 270 is configured to decrypt the encrypted parameter and to generate an authentication object (which may be encrypted as well) using the clear parameters. After decryption, the decrypted authentication object is sent to the client 210 with an authentication challenge generated by the challenge machine 270. Upon resolving the challenge, the client will be redirected back to the security system 250 with the authentication object. The security system 250 is configured to evaluate the authentication object provided by the client 210 and to authenticate or reject the client accordingly.

In various embodiments, upon authentication of a client (e.g., client 210), the security system 250 is configured to mark that client as a legitimate client (e.g., based on the client source IP Address, a client's fingerprint, etc.). Thereafter, all requests from the client 210 are forwarded to the server 220 or a direct connection is established between them. Connections with clients that failed the authentication process (e.g., attack tool 240) are terminated or otherwise suspended by the security system 250. In an embodiment, clients that failed the authentication challenges are directed back to the system 250. In one embodiment, an aging mechanism (e.g., a timer) is implemented to ensure that each client will be re-authenticated after a predefined time interval regardless of whether the client failed or passed pervious authentication attempts. In another embodiment, clients may be permanently blocked after a pre-configured number of failed authentication attempts.

Figure 3:
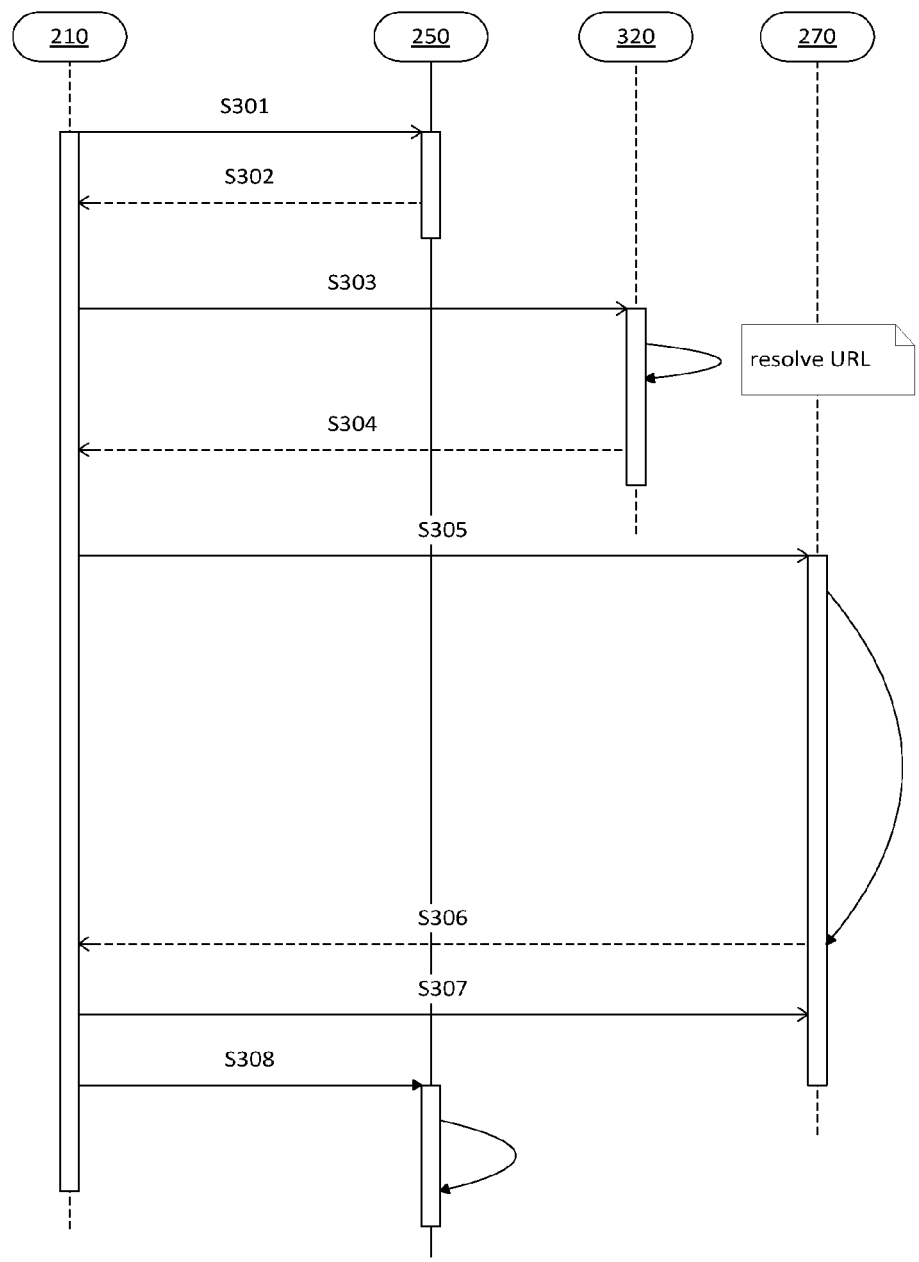
FIG. 3 is a sequence diagram illustrating interactions between components of a system during the authentication process according to one embodiment.

In certain exemplary embodiments, a domain name server (DNS) may be utilized to resolve URLs indicated in redirect scripts or response. A non-limiting sequence diagram 300 illustrating interactions of components of a system during the authentication process according to such embodiments is shown in FIG. 3.

A client 210 is an initially un-authenticated client. The security system 250 and a challenge machine 270 are as discussed above with reference to FIG. 2. At S301, a client sends a request to be provided to a protected server (server not shown in FIG. 3). The request is received at the security system 250. At S302, the security system 250 responds with a redirect script. The redirect script typically includes parameters, some of which may be encrypted, which are utilized to generate an authentication by a challenge machine. Such parameters include, for example, a source IP address of the client 210, a destination IP address, a secret seed, a system ID, and an original URL request by the client 210 (e.g., URL of the server 270). The destination IP address may be, for example, the IP address of a tenant in the protected server. In an embodiment, the redirect script redirects to a fully qualified domain name.

In an embodiment, to resolve the domain name in the redirect script, at S303, the client 210 sends a DNS request to the DNS 320, which returns the IP address of the challenge machine 270 (S304).

At S305, the client 210 sends a request to the challenge machine 270. The request includes, in part, the information embedded in the redirect script. As noted above, the request may also include parameters that can be used by the challenge machine 270 to generate an authentication object. At S306, the challenge machine 270 responds to the request of the client 210 by sending an authentication challenge to the client 210 together with an authentication object generated by the machine 270. At S307, the client 210 sends a notification back to the machine 270 in response to the requested challenge. The notification may include, for example, an action (e.g., mouse movement) that is required to pass the challenge.

If the client 210 passes the challenge, at S308, the client 210 is redirected back to the original requested URL with an authentication object prepared by the challenge machine 270. At S309, upon the security system 250 receiving the authentication object from the client 210 and validation of such object, the client is marked as legitimate and subsequent requests coming from the client 210 will be forwarded to the protected server.

Figure 4:
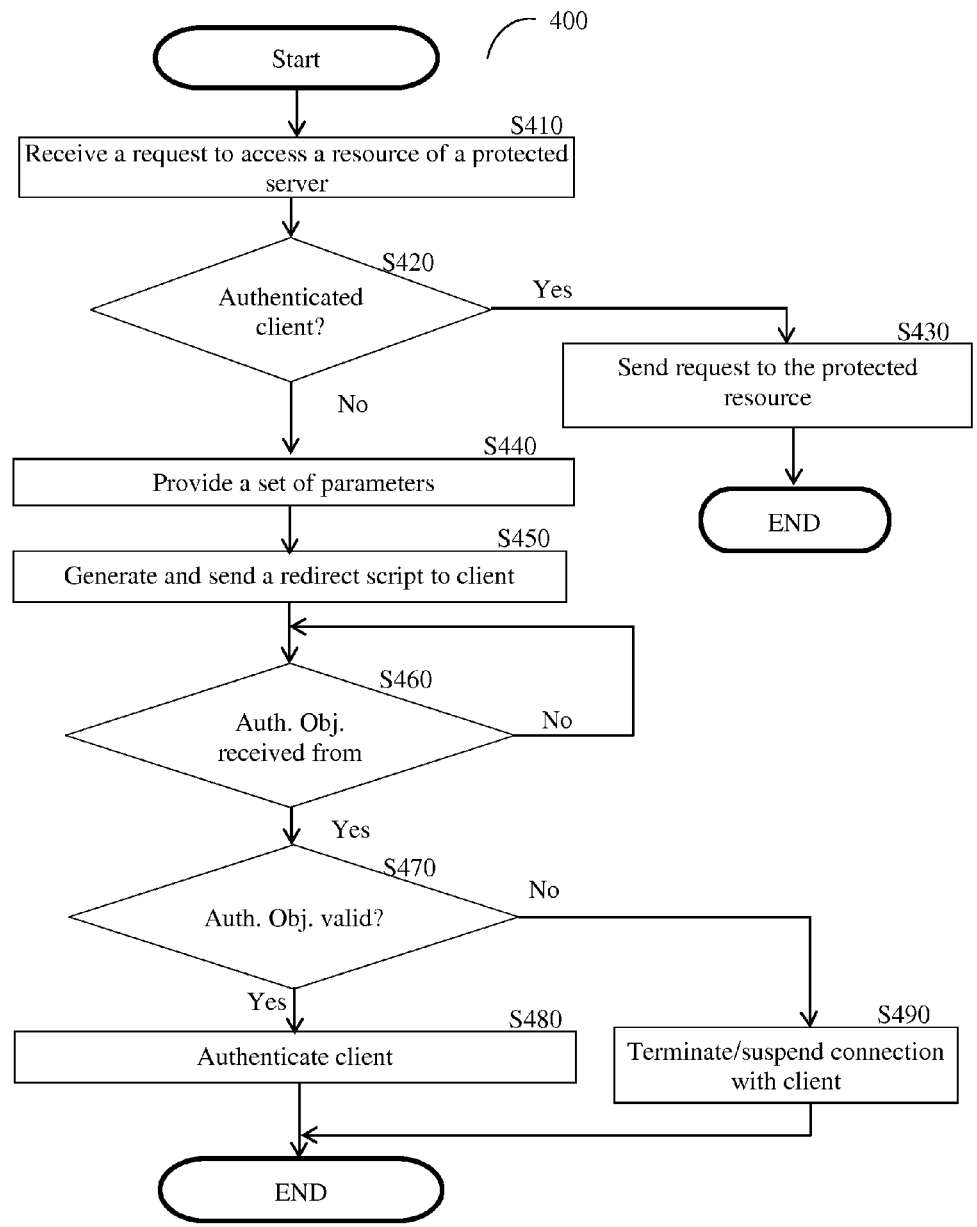
FIG. 4 is a flowchart describing a method for detecting malicious bots according to one embodiment.

FIG. 4 is an exemplary and non-limiting flowchart 400 describing the operation of the security system 250 according to one embodiment. At S410, a request to access a resource of a protected server is received from a client. The request may be, for example, HTTP or HTTPS request. The client may be a legitimate client or an attack tool executing a bot.

At S420, a check is made to determine if the client is an authenticated client. The check may be performed using, for example, a source IP, a fingerprint of the client, and/or a MAC address of the client, and comparing such identifiers against a list of previously authenticated clients. If so, execution continues with S430, where the received request is forwarded to the protected server; otherwise, execution continues with S440.

At S440, a set of parameters is provided. The parameters may be, but are not limited to, a random string, a MAC address, a client's source IP address, a fingerprint of the client, a time stamp, a URL of the protected server, a random number, a destination IP address of a tenant and so on, or any combination thereof. Other parameters that can be utilized in for selection of the authentication challenge and/or for uniquely identifying the client can be included in the script as well.

In a non-limiting embodiment, one or more of the set of parameters may be encrypted. An encryption key used to encrypt one or more of the parameters provided at S440 is shared with the challenge machines. The encryption key may be pre-shared or requested on-demand.

At S450, a redirect script is generated and sent back to the client. The script code when executed by the client's browser directs the client to a challenge machine. The script code may be coded using, for example, a Java programming language, HTML, HTML5, or any known scripting programming language. In one embodiment, the redirect script includes one or more of the parameters provided at S440.

At S460 it is checked if an authentication object was received from the client; and, if so, execution continues with S470; otherwise, execution waits at S460. The authentication object is generated by a challenge machine and provided to the client if the client passes a challenge. It should be noted that if the authentication object has not received within predefined waiting time, the client authentication fails and execution ends. The waiting time for receiving a notification may be preconfigured and can be set to a typical round trip time (RTT) between the protected server and the security system 250.

At S470, a check is made if the authentication object is valid and, if so, execution continues with S480, where the client is authenticated. As a result, any subsequent requests from the clients are relayed to the protected server without further inspection. As noted above, an aging timer may be applied to re-authenticate clients. If S470 results with an answer that the received authentication object is invalid, the client authentication fails. Execution proceeds with S490 when the client authentication fails. In this case, any connection between the security system 250 and the client may be terminated or suspended.

In an embodiment, an attacker profile is generated for each client that fails the authentication a predefined number of times. The attacker profile may include any of, for example, an IP address of the client, a fingerprint of the client, an authentication challenge(s) that the client fails, target of the requests, combinations thereof, and so on. The profile may be used for selecting challenges for the subsequent requests received from the client or to immediately block the client from accessing the protected resource, e.g., by adding the client to a black list. The generated attacker profiles are saved in a reputation database (e.g., the database 290).

Figure 5:
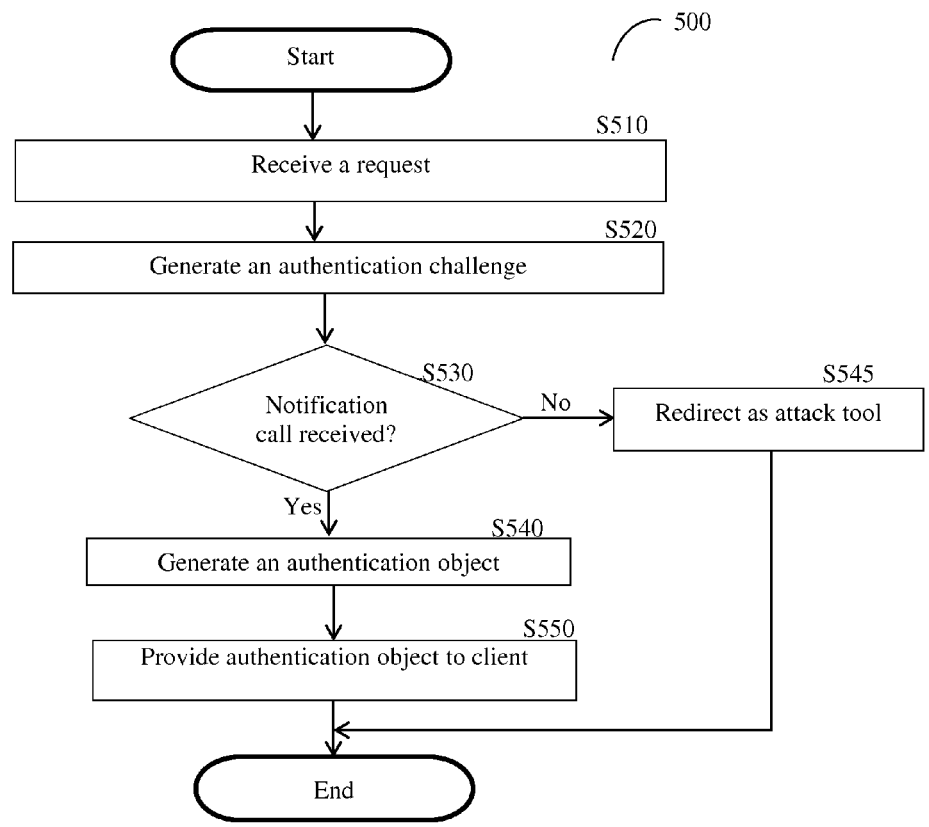
FIG. 5 is a flowchart describing the operation of a challenge machine according to one embodiment.

FIG. 5 is an exemplary and non-limiting flowchart 500 describing the operation of a challenge machine 270 according to one embodiment. The operation of the challenge machines 270 together with the security system 250 allows for providing efficient segregation between human-operated clients and machine-operated clients.

At S510, a request is received from the client. The request may be, for example, HTTP or HTTPS. The request is initiated by a redirect script sent by the security system to the client. As noted above, a redirect script can be realized as an Ajax call. The request includes the set of parameters included in the redirect script, such as the parameters provided at S440 (FIG. 4).

At S520, an authentication challenge is generated or otherwise selected. The machine may be preconfigured with the challenge to be used or the challenge can be selected on the fly. Selection of the challenge may be based on the services that the owner or a tenant of the protected server signed up for. Alternatively or collectivity, the selection may be based on the time and/or date, a mode of the security system ("war," e.g. attack active, or "peace," e.g. attack inactive), an indication obtained from a reputation database, geographical region of the client, a combination thereof, and so on. For example, during war times, more robust challenges can be selected relative to those selected in peace times. The indication obtained from a reputation database may be, for example, an attacker profile, a black list entry, and/or any information about the credibility of the client.

According to various exemplary embodiments, any of the following authentication challenges can take place: polymorphic script (discussed above), a challenge that requires user interaction (e.g., CAPTCHA check or a mouse movement), an obfuscated challenge, combinations thereof, and the like. In an embodiment, the machine 270 can collect interaction statistics with respect to the performed challenges in order to future distinguish between human and machine. The challenges are embedded in script code that can be executed by a legitimate client machine. The script code can be programmed to perform a page refresh or to allow redirection of the client to the URL of the protected server (original URL) and to send a notification call to the machine 270, if the client passes the challenges. In an embodiment, the script code is JavaScript.

At S530, it checked if a notification call has been received from the client and, if so, execution continues with S540; otherwise, at S545, the client is forwarded to the security system as the client is an attack tool. In an embodiment, the challenge machine is configured to a predefined period of time for the notification call. The waiting time for receiving a notification may be preconfigured and can be set to a typical round trip time (RTT) between the protected server and security system. In another embodiment, upon determination that the client is an attack tool, the challenge machine waits prolong duration of time before redirecting the client back to the system 250.

At S540, an authentication object is generated using one of more of the parameters in the redirect script (such parameters are provided as S440). If one of the parameters is encrypted, the encryption key utilized by the security system is used to encrypt such parameter. The encryption key may be provided by the security system. At S550, the authentication object is provided to the client. This results in a redirection of the client browser to the protected server (using the protected URL).

In certain embodiments, if the client fails to authenticate, the details about the client machine sending the malicious request are gathered and reported. Such details may include, but are not limited to, an IP address, a fingerprint, a geographical location, type of the machine, request type, and so on.

In one embodiment, the challenge machines 270 are configured to uniquely identify suspected clients, even if the requests to the protected servers are from a content delivery network (CDN) or a proxy server. Typically, a request from a CDN or a proxy server contains an IP address of the CDN/Proxy and not the un-authenticated client. According to this embodiment, the redirect script includes a source IP address as detected by the security system. Such an IP address is an IP address of the CDN or proxy server. The challenge machines 270 also inspect the received requests to detect the source IP addresses respective of clients directed to the machines 270. The address can be found, for example, in the HTTP header field. A challenge machine 270 is configured compare the detected source IP address to the address included in the redirected script. If these addresses are different, it is determined that an un-authenticated client is connected to a CDN or a proxy server. In a typical deployment, the CDN multiplexes transmission control protocol (TCP) sessions for a plurality of clients. In such deployment, the authentication and identification of each client is based on its fingerprint.

The foregoing description of implementations provides an illustration and description, but is not intended to be exhaustive or to limit the methods discussed with reference to FIGS. 4 and 5. Modifications and variations are possible in light of the above teachings. For example, while series of steps have been described with regard to FIGS. 4 and 5, the order of the steps may be modified in other implementations. Further, non-dependent steps may be performed in parallel.

Figure 6:
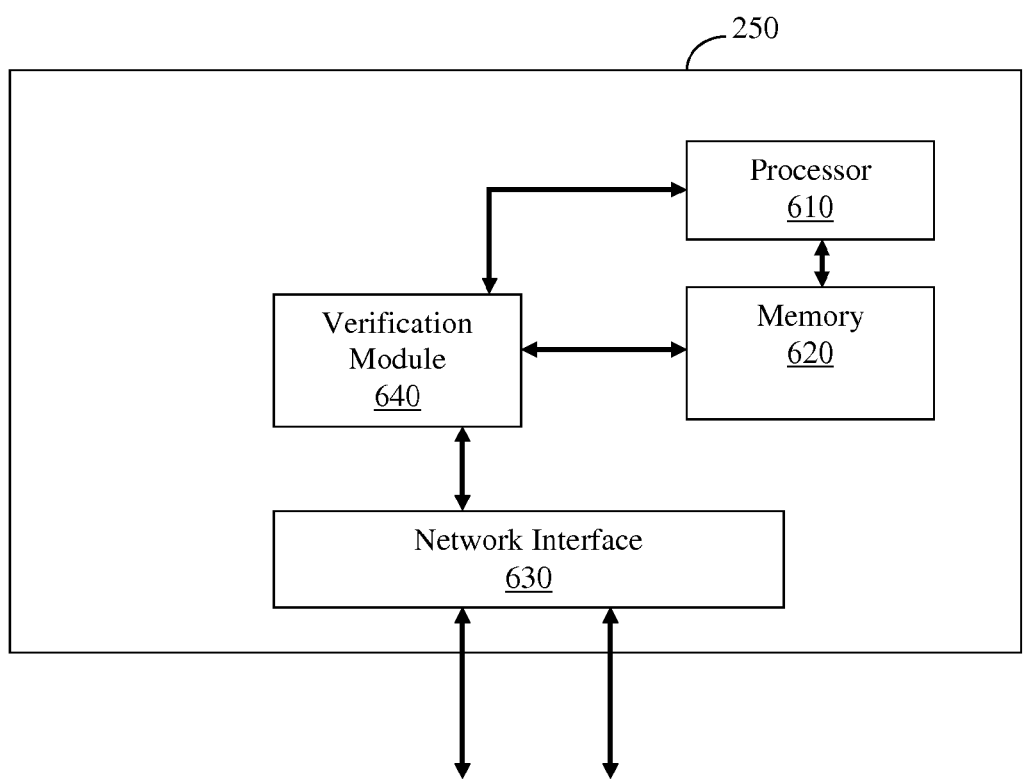
FIG. 6 shows a block diagram of a security system for detecting malicious bots and verifying client machines according to one embodiment.

FIG. 6 is an exemplary and non-limiting security system 250 constructed according to one embodiment. The security system 250 is configured to verify client machines accessing a protected server and to detect malicious bots. The security system 250 includes a processing unit 610 coupled to a memory 620, a network interface 630, and a verification module 640.

The network interface 630 allows for communication with client machines and a protected server through a network (e.g., a network 130). The verification module 640 is configured to receive requests and authentication objects from a client machine and to determine if the client runs a malicious bot. The operation of the verification module 640 is discussed in greater detail herein above with respect to FIG. 4. The processing unit 610 may include one or more processors. The memory 620 may comprise volatile and/or non-volatile memory components, including but not limited to the likes of static random access memory (SRAM), dynamic random access memory (SRAM), Flash memory, magnetic memory and other tangible media on which data and/or instructions may be stored.

The memory 620 may contain instructions that, when executed by the processing unit 610, controls, for example and without limitations, the operation of the verification module 640 to perform the verification and detection processes described in more detail in above.

Figure 7:
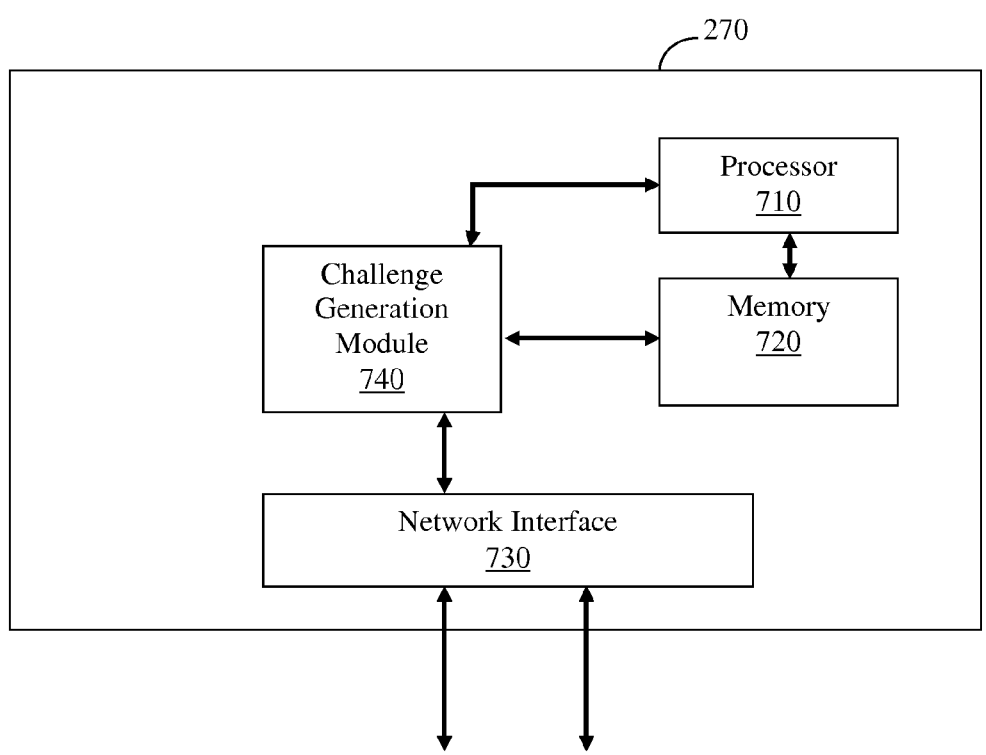
FIG. 7 shows a block diagram of a challenge machine constructed according to one embodiment.

FIG. 7 shows an exemplary and non-limiting block diagram of a challenge machine 270 constructed according to one embodiment. The challenge machine 270 is configured to generate challenges in the form of script code. The machine 270 is also configured to generate a code to verify client machines accessing a protected server and to detect malicious bots. The challenge machine 270 includes a processing unit 710 connected to a memory 720, a network interface 730, and an authentication challenge generation module 740.

The network interface 730 allows communication with client machines and a protected server through a network (e.g., the network 130). The challenge generation module 740 is configured to receive redirection and generates challenge script code. The challenge generation module 740 is configured to generate different types of challenges and to select the proper challenge to a client. The operation of the challenge generation module 740 is discussed in greater detail herein above with reference to FIG. 5. The processing unit 710 may include one or more processors. The memory 720 may comprise volatile and/or non-volatile memory components, including but not limited to the likes of static random access memory (SRAM), dynamic random access memory (SRAM), Flash memory, magnetic memory and other tangible media on which data and/or instructions may be stored.

The memory 720 may contain instructions that, when executed by the processing unit 710, controls, for example and without limitations, the operation of the script generation module 740 to perform the verification and detection processes described in more detail in above.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing segregation between human-operated clients and machine-operated clients accessing computing resources, comprising:

receiving, from a client, an authentication request, wherein the authentication request is received in response to a redirect request sent from a remote server to the client;

dynamically selecting at least one authentication challenge from a plurality of different authentication challenges wherein the selection of the at least one authentication challenge is based at least on an indication of ongoing attacks and an indication of a type of the ongoing attacks;

sending the at least one selected authentication challenge to the client;
determining whether a notification call is received from the client during a predefined time interval; and
upon receiving the notification call during the predefined time interval, confirming that the client passes the at least one selected authentication challenge, wherein when the client passes the at least one selected authentication challenge the client is identified as a human-operated client.

2. The method of claim 1, wherein confirming that the client passes the at least one selected authentication challenge further comprises:
generating an authentication object using a set of parameters included in the redirect request; and
providing the authentication object to the remote server.

3. The method of claim 2, wherein the set of parameters includes at least one of: a random string, a random number, a medium access control (MAC) address, a source IP address of the client, a fingerprint of the client, a time stamp, a uniform resource locator (URL) of a protected entity, and a destination IP address of a tenant.

4. The method of claim 2, wherein at least one parameter of the set of parameters is encrypted.

5. The method of claim 1, wherein the redirect request is generated by the remote server when the client attempts to access a computing resource of a protected entity.

6. The method of claim 1, wherein the predefined time interval is set based on a round trip time (RTT) between a protected entity and the remote server.

7. The method of claim 1, wherein upon confirming that the client passes the authentication challenge, the client is allowed to access a protected entity without further authentication during a predefined time period, wherein the predefined time period is set by at least an aging timer.

8. The method of claim 1, wherein the client that fails the at least one selected authentication challenge is identified as a malicious machine-operated client.

9. The method of claim 8, further comprising:
gathering information related to the malicious machine-operated client;
creating a profile for the malicious machine-operated client; and
saving the profile in a reputation database.

10. The method of claim 1, further comprising: generating the at least one selected authentication challenge, wherein the at least one selected authentication challenge is programmed to detect if the client is a human-operated client.

11. The method of claim 10, wherein the at least one selected authentication challenge is at least one of: a polymorphic script, a challenge that requires user interaction, and an obfuscated challenge.

12. The method of claim 1, wherein the selection of the at least one authentication challenge is further based on at least one of: a service assigned to a resource of a protected entity, a time, a date, a geographical location of the client, a profile of the client, and an indication from a reputation database.

13. The method of claim 1, further comprising:
upon failing to confirm that the client passes the at least one selected authentication challenge, selecting a new authentication challenge.

14. The method of claim 13, wherein selecting the new authentication challenge is based on an escalation scenario.

15. The method of claim 14, wherein the escalation scenario defines a certain order to execute a set of different authentication challenges, wherein the order of execution is determined based on at least one of: a type of attack, properties of the client, and a type of a protected entity.

16. The method of claim 10, wherein the generated authentication challenge is embedded in a piece of code executed by the client.

17. The method of claim 1, further comprising:
detecting if the client is connected to any of: a content delivery network (CDN), and a proxy server.

18. The method of claim 17, further comprising:
matching a source Internet protocol (IP) address designated in the received authentication request to a source IP of the client; and
detecting the client as connected to any of the content delivery network (CDN) and the proxy server when the source IP address of the client and the source IP address designated in the received authentication request do not match.

19. The method of claim 18, wherein the client is determined to be unauthenticated when the client is connected to any one of: the CDN, and the proxy.

20. The method of claim 19, further comprising:
uniquely identifying at least the client from a plurality of clients connected through the CDN based on a fingerprint of each client.

21. The method of claim 20, wherein the CDN multiplexes transmission control protocol (TCP) sessions for the plurality of clients.

22. The method of claim 1, wherein the method is performed by at least one challenge machine allocated on demand for generating the at least one selected authentication challenge, wherein the at least one challenge machine is operable in a cloud computing platform and is de-coupled from the remote server.

23. A non-transitory computer readable medium having stored thereon instructions for causing one or more processing units to execute a method comprising:
receiving, from a client, an authentication request, wherein the authentication request is received in response to a redirect request sent from a remote server to the client;
dynamically selecting at least one authentication challenge from a plurality of different authentication challenges wherein the selection of the at least one authentication challenge is based at least on an indication of ongoing attacks and an indication of a type of the ongoing attacks;
sending the at least one selected authentication challenge to the client;
determining whether a notification call is received from the client during a predefined time interval; and
upon receiving the notification call during the predefined time interval, confirming that the client passes the at least one selected authentication challenge, wherein when the client passes the at least one selected authentication challenge the client is identified as a human-operated client.

24. A challenge machine for authenticating clients accessing computing resources, comprising:
a processing circuitry; and
a memory communicatively connected to the processing circuitry, the memory containing instructions that, when executed by the processing circuitry, configure the challenge machine to:
receive, from a client, an authentication request, wherein the authentication request is received in response to a redirect request sent from a remote server to the client;

dynamically select at least one authentication challenge from a plurality of different authentication challenges wherein the selection of the at least one authentication challenge is based at least on an indication of a type of ongoing attack;

send the at least one selected authentication challenge to the client;

determine whether a notification call is received from the client during a predefined time interval; and confirm, upon receiving the notification call during the predefined time interval, that the client passes the at least one selected authentication challenge, wherein the client that passes the at least one selected authentication challenge is identified as a human-operated client.

25. The challenge machine of claim 24, wherein the challenge machine is allocated on demand for generating the at least one selected authentication challenge, wherein the at least one challenge machine is operable in a cloud computing platform and is de-coupled from the remote server.

26. A method for authenticating clients accessing computing resources, comprising:

receiving, from a client, a request to access a computing resource of a protected entity;

generating a redirect request including a set of parameters;

sending the redirect request to the client, wherein the redirect request causes the client to access at least one challenge machine;

receiving, by the at least one challenge machine, an authentication request, wherein the authentication request is received in response to the redirect request;

dynamically selecting at least one authentication challenge from a plurality of different authentication challenges by the at least one challenge machine for execution by the client wherein the selection of the at least one authentication challenge is based at least on an indication of ongoing attacks and an indication of a type of the ongoing attacks;

generating an authentication object using the set of parameters included in the redirect request, wherein the authentication object is generated upon passing the at least one selected authentication challenge by the client, the passing being indicated by a notification call received from the client during a predefined time interval; and receiving, by a system, the authentication object from the at least one challenge machine; and upon determining that the authentication object is valid, authenticating the client.

27. The method of claim 26, wherein the at least one challenge machine and the system are operable in remote locations from each other.

* * * * *